(12) United States Patent
Henson

(10) Patent No.: US 8,733,398 B2
(45) Date of Patent: May 27, 2014

(54) SHUT-DOWN ARRANGEMENT

(75) Inventor: Nigel Herbert Henson, Warwick (GB)

(73) Assignee: Rolls-Royce Controls and Data Services Limited, Derby (GB)

( * ) Notice: Subject to any disclaimer, the term of this patent is extended or adjusted under 35 U.S.C. 154(b) by 680 days.

(21) Appl. No.: 12/777,604

(22) Filed: May 11, 2010

(65) Prior Publication Data

US 2010/0288951 A1 Nov. 18, 2010

(30) Foreign Application Priority Data

May 18, 2009 (GB) ................... 0908485.6

(51) Int. Cl.
*F02B 77/08* (2006.01)
(52) U.S. Cl.
USPC . 137/637; 137/613; 251/129.01; 123/198 DB
(58) Field of Classification Search
USPC ............. 123/198 DB; 251/129.01, 129.04; 137/637, 613
See application file for complete search history.

(56) References Cited

U.S. PATENT DOCUMENTS

| 3,785,148 | A | | 1/1974 | Luongo |
| 3,911,685 | A | | 10/1975 | Cronin et al. |
| 4,574,752 | A | * | 3/1986 | Reichert et al. ........ 123/198 DB |
| 7,337,761 | B2 | | 3/2008 | Bickley |
| 2005/0217236 | A1 | | 10/2005 | Wernberg et al. |
| 2007/0113559 | A1 | | 5/2007 | Zagranski et al. |

OTHER PUBLICATIONS

European Search Report dated Mar. 13, 2012.

* cited by examiner

*Primary Examiner* — Eric Keasel
(74) *Attorney, Agent, or Firm* — Oliff PLC

(57) ABSTRACT

A shut-down arrangement comprises a shut-off actuation device operable under the control of a control unit, a switch whereby a first shut-down signal can be supplied to the control unit and whereby a second shut-down signal can be supplied to the shut-off actuation device, and delay means whereby the transmission of the second shut-down signal to the shut-off actuation device is delayed relative to the transmission of the first shut-down signal to the control unit.

5 Claims, 2 Drawing Sheets

SHUT-DOWN ARRANGEMENT

This invention relates to a shut-down arrangement for use in controlling the operation of a fuel control system during the shutting down of an associated engine.

A typical shut-down arrangement has two modes of operation. In normal use, the shut-down arrangement controls the fuel control system such that the supply of fuel to the engine is shut-off relatively slowly. Such operation is advantageous in that fatigue damage is low, thus this mode of operation is suitable for regular or repeated use. In the second mode of operation, the fuel supply is rapidly shut-off. This mode of operation is used in emergency situations where it is important to ensure that the engine is shut-down very quickly. During the rapid shut-down mode of operation, high pressure spikes may occur in parts of the fuel system, resulting from the well known phenomenon of fluid hammer. These pressure spikes may give rise to fatigue damage which is obviously undesirable. However, provided this mode of operation is only used infrequently, this is not problematic.

The two modes of operation are typically achieved using separate control valve arrangements. For example, the normal, relatively slow shut-down maybe achieved using a single stage servo-valve with relatively small flow restrictions, whereas the fast shut-down may be achieved using a two stage servo-valve with larger area flow restrictions. The provision of two separate devices for use in controlling shut-down results in the system being relatively heavy. It is desirable to minimise the weight of the shut-down arrangement, and one way in which this has been achieved is to omit the relatively slow shut-down functionality and to use the rapid shut-down mode for all engine shut-down events. Such a system achieves the desired weight saving whilst ensuring that safety levels are maintained as rapid engine shut-down in an emergency situation is still achieved in an acceptably short period of time. One such system is described in U.S. Pat. No. 7,337,761. However, as mentioned above, the fluid hammer induced pressure spikes which can occur during such a shut-down operation can cause fatigue. Although the occurrence of such pressure spikes may be acceptable when the rapid shut-down mode is used only infrequently, their presence is undesirable in a system regularly used to control the normal shut-down of an engine.

It is an object of the invention to provide a shut-down arrangement in which at least some of the disadvantages of known arrangements as outlined hereinbefore are overcome or are of reduced effect.

According to the present invention there is provided a shut-down arrangement comprising a shut-off actuation device operable under the control of a control unit, a switch whereby a first shut-down signal can be supplied to the control unit and whereby a second shut-down signal can be supplied to the shut-off actuation device, and delay means whereby the transmission of the second shut-down signal to the shut-off actuation device is delayed relative to the transmission of the first shut-down signal to the control unit.

With such an arrangement, rapid shut-down under the control of the control unit can still be achieved. When a normal, slower shut-down is required the switch is operated by the pilot to instruct shut-down. This results in the transmission of the first shut-down signal to the control unit which allows the control unit to prepare the associated systems for shut-down so that the subsequent operation of the shut-off actuation device upon receipt of the delayed second shut-down signal can take place without the occurrence of damaging high pressure spikes.

The control unit conveniently prepares the associated systems for shut-down by controlling a metering device in such a manner as to reduce the supply of fuel to the associated engine.

The control unit is preferably of dual channel form, and separate first shut-down signals are preferably transmitted to each channel by the switch, in use. The switch is thus conveniently of three pole form to provide separate signals for each channel of the control unit and to produce the second shut-down signal.

The shut-off actuation device is preferably electrically operated and includes a coil operable in response to the receipt of the second shut-down signal and arranged in parallel to one or more coils (two coils where a dual channel control unit is used) operated under the control of the control unit.

The invention will further be described, by way of example, with reference to the accompanying drawings, in which.

Figure 1:
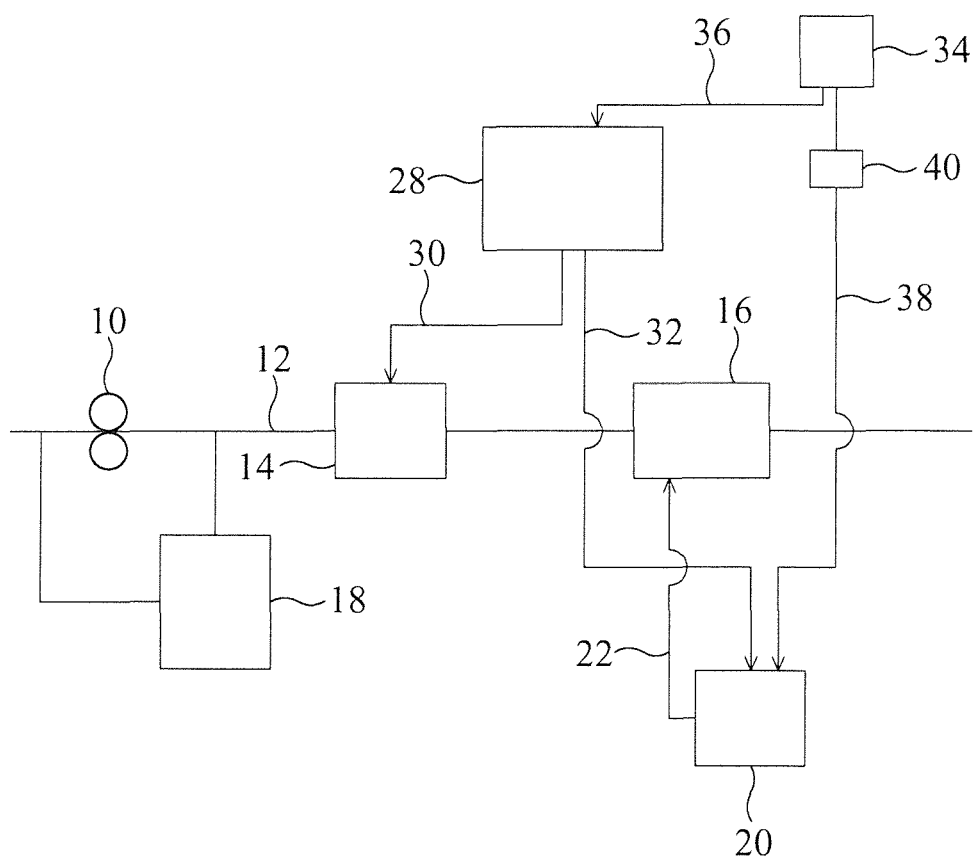
FIG. 1 is a simplified block diagram illustrating a fuel control system incorporating a shut-down arrangement in accordance with one embodiment of the invention.

The fuel control system illustrated diagrammatically in FIG. 1 comprises a high pressure fuel pump 10 arranged to supply fuel through a line 12 to a metering valve 14. The metering valve 14 controls the delivery of fuel to a pressure raising and shut-off valve (PRSOV) 16 from where fuel is delivered to a burner manifold associated with an aircraft engine (not shown). A spill valve arrangement 18 is operable to return fuel from the line 12 to the low pressure side of the pump 10 for the purpose of maintaining the pressure drop across the metering valve 14 at a fixed level.

Figure 2:
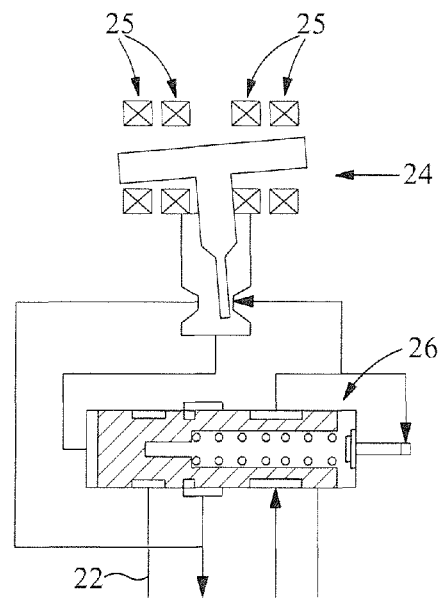
FIG. 2 is a view illustrating part of the shut-down arrangement.

A shut-off actuation device 20 is provided, the shut-off device 20 being operable to vary a control pressure applied to the PRSOV 16 along a line 22 in response to control signals applied to the shut-off device 20. When the shut-off device 20 receives a control signal commanding shutting down of the fuel system, the shut-off device 20 operates to increase the control pressure applied to the PRSOV 16 along the line 22, resulting in PRSOV 16 closing, and the supply of fuel to the burner manifold terminating. As illustrated in FIG. 2, the shut-off actuation device 20 takes the form of an electro-hydraulic arrangement comprising a torque motor operated valve 24 controlling the fluid pressures applied to the ends of a spool valve 26. The position occupied by the spool valve 26 determines whether or not the line 22 is connected to low pressure or high pressure. The torque motor of the valve 24 has a series of coils 25 associated therewith to which control signals can be applied to control the operation of the valve 24. In the embodiment illustrated in FIG. 2 and described herein there are four coils 25. The functions of these four coils are as follows:

(a) start coil wire to both EEC channels (not shown in FIG. 3)
(b) channel A emergency protection coil
(c) channel B emergency protection coil
(d) pilot/normal shut-down coil It will be appreciated by those skilled in the art that the number of coils can be increased or decreased depending upon the complexity of the fuel control system.

As shown in FIG. 1, a control unit 28 in the form of an engine electronic control (EEC) unit is arranged to control the operation of the metering valve 14 and the shut-off actuation device 20 through control lines 30, 32. Although not illustrated, the control over the operation of the metering valve 14 will typically be a closed loop control, the control unit 28 receiving position information indicative of the operating position of the metering valve 14 at any given time.

Figure 3:
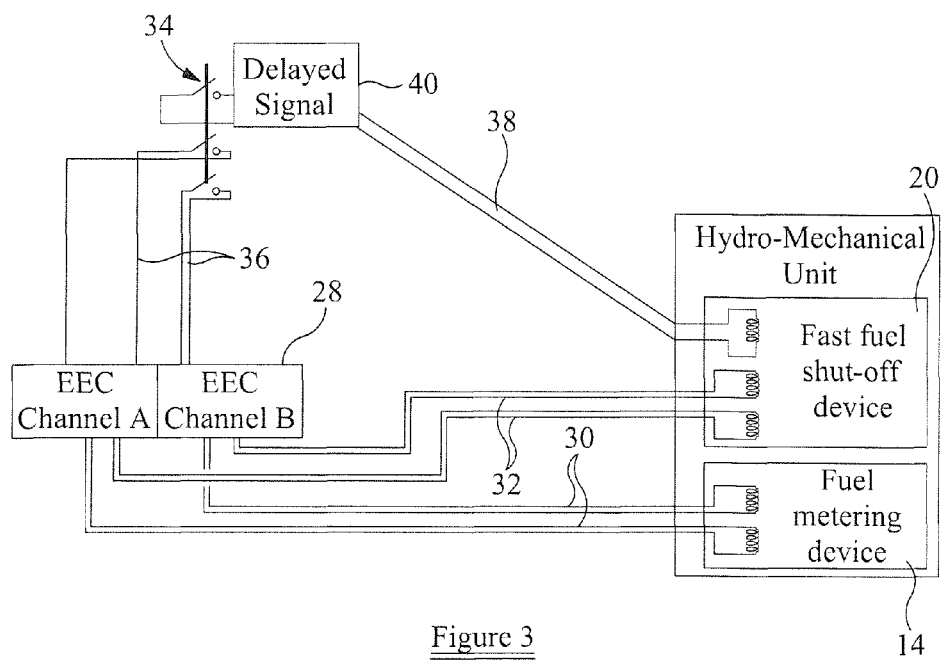
FIG. 3 is a further diagram illustrating the shut-down arrangement of the system of FIG. 1.

As best shown in FIG. 3, the control unit 28 is of dual channel type, and consequently a pair of control lines 30 connect the two channels of the control unit 28 to the metering valve 14, and similarly a pair of control lines 32 connect the channels of the control unit 28 to the shut-off actuation device 20.

Referring again to FIG. 1, the fuel control system further comprises a three-pole switch 34 located on the flight deck and operable by the pilot of the aircraft when commanding a shut-down of the engine. The switch 34 is connected by a control line 36 to the control unit 28, and is also connected via a further control line 38 to the shut-off actuation device 20. The further control line 38 incorporates delay means 40 to delay the transmission of a control signal from the switch 34 to the shut-off actuation device 20.

In normal use, with the switch 34 in the position illustrated in FIG. 3, the control unit 28 controls the operation of the metering valve 14 to control the delivery of fuel to the associated engine. If the control unit 28 determines that a failure has occurred which necessitates the rapid shutting down of the engine, then the control unit 28 commands the shut off actuation device 20 by the application of an appropriate command signal to the control line 32 to cause PRSOV 16 to close, as described hereinbefore, thus terminating the supply of fuel to the engine manifold. Terminating the supply of fuel to the engine in this manner carries the risk of the occurrence of high pressure spikes in the fuel system which is undesirable. Consequently, shutting down the fuel system in this manner is typically only undertaken rarely, and in the event of an emergency.

During a normal engine shut-down procedure, the switch 34 is operated resulting in the application of a first shut-down signal transmitted along the control lines 36 to the control unit 28. Upon receipt of this signal, the control unit 28 will control the metering valve 30 in such a manner as to gradually reduce the supply of fuel to the associated engine. In addition to the generation of the first shut-down signal which is transmitted along the control line 36 to the control unit 28, a second shut-down signal is applied by the switch 34 to the control line 38. As mentioned hereinbefore, the control line 38 incorporates delay means 40 which serves to delay the transmission of the second shut-down signal to the shut-off actuation device 20 with the result that the second shut-down signal is only received by the shut-off actuation device 20 after the control unit 28 has had an opportunity to respond to receipt of the first shut-down signal. Upon receipt of the second shut-down signal, the shut-off actuation device 20 operates in the manner described hereinbefore to close the PRSOV 16 and terminate the supply of fuel to the engine. However, by the time this occurs, the operation of the control unit 28 will have already served to reduce the fuel flow within the fuel system thereby minimising the risk of the production of fluid hammer induced high pressure spikes within the fuel system. By avoiding the generation of such spikes, the risk of fatigue damage is minimised. It will be appreciated that the risk of such damage is minimised whilst achieving weight savings in that only a single shut-off actuation device needs to be provided.

In an emergency, if both channels of the control unit 28 have failed and thus there is no automated shut-down of the fuel control system under the control of the control unit 28 then operation of the switch 34 will still result in shut-down occurring. In such circumstances, the transmission of the first control signal to the control unit 28 will have little effect as both channels of the control unit 28 have failed. However, upon receipt of the delayed second shut-down signal, the shut-off actuation device 20 will operate to cause the rapid shut-down of the fuel control system. There is a risk of high pressure spikes occurring in such a shut-down as the control unit 28 will not have been able to reduce the fuel flow. However, this is acceptable in these extraordinary circumstances.

Although the presence of the delay means 40 results in the operation of the shut-off actuation device 20 being delayed, compared to a traditional arrangement in which two separate shut-off actuation devices are provided, the arrangement of the present invention will still achieve the required time for termination of the fuel supply to the engine in an emergency situation since the response time of the arrangement of shut-off actuation device 20 and PRSOV 16 is relatively fast.

The precise delay introduced by the operation of the delay means 40 may take a range of values. It is envisaged that in the embodiment of the invention described herein the delay means 40 will introduce a delay in the operation of the shut-off actuation device 20 of approximately 0.950 seconds. Since the response time of a typical arrangement of shut-off actuation device 20 and PRSOV 16 is of the order of 0.045 seconds, the total response time of the fuel control system in terminating the supply of fuel to the engine in an emergency situation will not exceed 1 second, a typical airframe safety requirement. It is recognised, however, that the invention is not restricted to a delay of this period of time.

A further benefit of the invention is that the delayed shut-down, in normal operation, enables enhanced flexibility in the scheduling of fuel system checks, commonly referred to as BITE checks, between the engine start-up and engine shut-down routines.

A specific embodiment of the invention is described hereinbefore. However, it will be appreciated that the invention is not restricted to this specific arrangement or to use with the specific form of fuel control system or shut-off actuation device outlined hereinbefore. Rather, a range of modifications and alterations may be made to the arrangement described hereinbefore without departing from the scope of the invention.

The invention claimed is:

1. An aircraft engine fuel control system shut-down arrangement comprising:
a fuel shut-off actuation device;
a fuel shut-off device controlled by the fuel shut-off actuation device;
an engine electronic control unit configured to transmit a first control signal to the fuel shut-off actuation device, the fuel shut-off actuation device closing the fuel shut-off device upon receipt of the first control signal;
a metering device located upstream of the fuel shut-off device in a flow configured to supply fuel to an associated aircraft engine;
a switch configured to transmit a first shut-down signal to the engine electronic control unit and configured to transmit a second shut-down signal to the fuel shut-off actuation device, the fuel shut-off actuation device closing the fuel shut-off device upon receipt of the second shut-down signal; and
a delay device configured to delay transmission of the second shut-down signal to the fuel shut-off actuation device relative to transmission of the first shut-down signal to the engine electronic control unit,
wherein the engine electronic control unit is configured to transmit, upon receipt of the first shut-down signal, a second control signal to the metering device so that the metering device reduces supply of fuel to the associated aircraft engine.

2. An aircraft shut-down arrangement according to claim 1, wherein the engine electronic control unit is of dual channel form.

3. An aircraft shut-down arrangement according to claim 2, wherein separate first shut-down signals are transmitted to each channel of the engine electronic control unit by the switch, in use.

4. An aircraft shut-down arrangement according to claim 2, wherein the switch is of three pole form to provide separate signals for each channel of the engine electronic control unit and to produce the second shut-down signal.

5. An aircraft shut-down arrangement according to claim 1, wherein the fuel shut-off actuation device (1) is electrically operated and (2) includes a coil that is operable in response to receipt of the second shut-down signal and that is arranged in parallel to at least one coil operated under the control of the engine electronic control unit.

* * * * *